United States Patent
VanFleet et al.

(10) Patent No.: US 7,580,857 B2
(45) Date of Patent: Aug. 25, 2009

(54) METHODS AND SYSTEMS FOR ONLINE TRANSACTION PROCESSING

(75) Inventors: Steven L. VanFleet, Southport, CT (US); Blake Benton, Omaha, NE (US); Matthew T. Byrne, Papillion, NE (US); Timothy Horton, Papillion, NE (US); John J. Mascavage, III, Bellevue, WA (US); Cassandra J. Mollett, Scottsdale, AZ (US); Susan M. Nelson, Omaha, NE (US); SuZanne Rogers, Elkhorn, NE (US); Rhonda D. Sargent, Cumming, GA (US); Martin Stivers, Glenwood, IA (US); Gary J. Trainor, Duluth, GA (US); Margaret Weichert, Charlotte, NC (US); Diane Wing, East Lansing, MI (US)

(73) Assignee: First Data Corporation, Greenwood Village, CO (US)

( * ) Notice: Subject to any disclaimer, the term of this patent is extended or adjusted under 35 U.S.C. 154(b) by 1018 days.

(21) Appl. No.: 10/825,971

(22) Filed: Apr. 16, 2004

(65) Prior Publication Data

US 2005/0234833 A1 Oct. 20, 2005

(51) Int. Cl.
*G06F 17/60* (2006.01)
(52) U.S. Cl. .............................. 705/14; 705/26; 235/379
(58) Field of Classification Search ................... 705/14, 705/40, 41, 42, 39
See application file for complete search history.

(56) References Cited

U.S. PATENT DOCUMENTS

| | | | |
|---|---|---|---|
| 5,764,789 A | 6/1998 | Pare et al. | |
| 5,805,719 A | 9/1998 | Pare et al. | |
| 6,173,272 B1 * | 1/2001 | Thomas et al. | 705/42 |
| 6,609,113 B1 * | 8/2003 | O'Leary et al. | 705/39 |
| 6,678,664 B1 | 1/2004 | Ganesan | |
| 6,704,714 B1 * | 3/2004 | O'Leary et al. | 705/39 |
| 2001/0054003 A1 * | 12/2001 | Chien et al. | |
| 2002/0013728 A1 * | 1/2002 | Wilkman | |
| 2002/0111907 A1 * | 8/2002 | Ling | |
| 2003/0009382 A1 | 1/2003 | D'Arbeloff er al. | |
| 2004/0107170 A1 * | 6/2004 | Labrou et al. | |
| 2004/0138989 A1 | 7/2004 | O'Malley | |
| 2004/0260607 A1 | 12/2004 | Robbins et al. | |

\* cited by examiner

*Primary Examiner*—Evens J Augustin
(74) *Attorney, Agent, or Firm*—Townsend and Townsend and Crew LLP (57) ABSTRACT

Methods and systems coordinate an Internet-based financial transaction between an Internet merchant and a customer. A first information packet is received with a payment network from the Internet merchant. The first information packet has a credential assigned to the customer and transaction information specifying at least a cost of the Internet-based financial transaction. With the payment network, account information is determined that identifies a financial account maintained by the customer at a financial institution and authorization information that allows debit access to the identified financial account. A second information packet that includes the transaction information, the account information, and the authorization information is generated with the payment network. The second information packet is transmitted with the payment network to the financial institution with a request to perform a debit transaction from the identified financial account for the specified cost of the Internet-based financial transaction.

5 Claims, 5 Drawing Sheets

METHODS AND SYSTEMS FOR ONLINE TRANSACTION PROCESSING

CROSS-REFERENCES TO RELATED APPLICATIONS

This application is related to the following co-pending, commonly-assigned and concurrently filed U.S. Patent Applications, the entirety of each of which are herein incorporated by reference for all purposes: U.S. patent application Ser. No. 10/825,960, entitled "METHODS AND SYSTEMS FOR PRIVATE LABEL TRANSACTION PROCESSING"; and U.S. patent application Ser. No. 10/825,950, entitled "METHODS AND SYSTEMS FOR UNIVERSAL TRANSACTION PROCESSING".

BACKGROUND OF THE INVENTION

This application relates generally to online transaction processing. More specifically, this application relates to methods and systems that allow debit transactions to be performed as part of online transaction processing.

In recent years, there has been a steady increase in the use of the Internet for a variety of different business purposes, particularly as an alternative mechanism for performing commercial transactions. Such commercial transactions typically parallel more traditional nonelectronic transactions in that a customer may peruse an offering of goods and/or services and supply payment to purchase desired products. Because of the nature of electronic transactions, the variety of payment mechanisms that may be used have tended to be more restricted than what is available for traditional nonelectronic transactions. The most obvious example of a payment mechanism that is not accepted electronically is cash, with other examples including checks, money orders, and debit transactions. By far, the most common payment mechanism that has been used for electronic transactions is a credit-based mechanism in which the customer supplies an online merchant with a credit-card number. Upon verification of the status of the associated credit account, the merchant agrees to ship the requested goods, provides immediate access to online information, or performs some other service.

While the use of such a credit-based system is appropriate for a number of circumstances, it also suffers from certain disadvantages. One disadvantage in particular is that credit transactions are generally not guaranteed. That is, a merchant who accepts a credit card for payment takes a risk that the payment will never be received because the cardholder disputes the legitimacy of the transaction. This may happen, for example, in a number of different fraud circumstances, with the nonguaranteed nature of the credit transaction resulting in the merchant being the victim of the fraud.

This is in contrast to traditional debit-based transactions, which generally are guaranteed to the merchant because specific funds identified in an account are designated at the time of the transaction as being allocated to the transaction. There has long been a desire to implement such debit-based transactions in an online environment, but there have been a number of barriers to doing so because of the need to have greater authentication when providing a guaranteed transaction. Some attempts have been made to provide simulated debit-based transactions, notably with Paypal® and similar types of systems. In these types of systems, an account maintained by a service provider may hold funds that are received from a credit-based account or sometimes from a bank account, although such bank-account sources use traditional transfer mechanisms that typically take days until the funds are available. Once under the control of the service provider, these funds may be distributed to merchants by the service provider upon instructions from the customer.

While such systems provide a convenient mechanism for many customers to engage in electronic commerce, their primary advantage is in limiting the disclosure of credit-account information. They still do not allow customers to engage in actual debit transactions that access funds from a financial-institution account during a transaction. There remains a need in the art for methods and systems that allow customers to perform electronic debit transactions.

BRIEF SUMMARY OF THE INVENTION

Embodiments of the invention thus provide methods and systems for coordinating an Internet-based financial transaction between an Internet merchant and a customer. A first information packet is received with a payment network from the Internet merchant. The first information packet comprises a credential assigned to the customer and transaction information specifying at least a cost of the Internet-based financial transaction. With the payment network, account information is determined that identifies a financial account maintained by the customer at a financial institution and authorization information that allows debit access to the identified financial account. A second information packet comprising the transaction information, the account information, and the authorization information is generated with the payment network. The second information packet is transmitted with the payment network to the financial institution with a request to perform a debit transaction from the identified financial account for the specified cost of the Internet-based financial transaction.

In some embodiments, a response is received with the payment network from the financial institution indicating approval or denial of the debit transaction. An authorization code is transmitted to the Internet merchant indicating approval or denial of the Internet-based financial transaction in accordance with the response received from the financial institution. The payment network may also perform a risk analysis of the Internet-based financial transaction and determine whether to provide a guarantee of the Internet-based transaction to the Internet merchant based on the risk analysis; in such a case, the authorization code further reflects whether the guarantee is provided. Whether to consider providing a guarantee may be prompted in a variety of different ways in different embodiments. For instance, in one embodiment, the first information packet includes an identification of the Internet merchant and a determination is made whether the Internet merchant is one of an identified list of Internet merchants who request guarantees of all Internet-based financial transactions. In another embodiment, the determination whether to provide the guarantee comprises a determination whether the transaction information is consistent with a predefined set of parameters. In still another embodiment, the first information packet further comprises a request from the Internet merchant for the guarantee of the Internet-based transaction.

Transmission of the second information packet to the financial institution may also be accomplished in different ways in different embodiments. For instance, in one embodiment, the second information packet is transmitted to the financial institution over an automated clearing house ("ACH") network. In another embodiment, the second information packet is transmitted to the financial institution over a debit system. In other instances, the second information packet may be transmitted directly to the financial institution.

The information comprised by the second information packet may vary according to the embodiment. For instance, in one embodiment, the account information comprises a primary account number ("PAN") for the identified financial account and the authorization information comprises a personal identification number ("PIN") assigned to the customer for accessing the identified financial account. In other embodiments, different information may be used. Also, the credential received as part of the first information packet may vary according to the embodiment. In one embodiment, the credential comprises an electronic file having encrypted content received from the customer, in which case determining account information comprises decrypting the encrypted content.

The payment network may also be configured to provide a variety of additional functions implemented in combination with coordinating the Internet-based financial transaction. For instance, in one embodiment, a loyalty program may be managed by crediting the program for the customer in response to execution of the Internet-based financial transaction.

The methods of the present invention may be embodied in a payment network having a communications device, a processor, a storage device, and a memory coupled with the processor. The memory comprises a computer-readable medium having a computer-readable program embodied therein for directing operation of the payment network. The computer-readable program includes instructions for operating the computer system to manage information in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for online transaction processing. The online transactions that are implemented with such embodiments may involve the purchase of goods and/or services over the Internet, in which a customer selects such products and provides information that allows execution of a debit transaction. An overview of one arrangement of a system that may be used to support such transactions is provided in FIG. 1. The transactions are supported by a payment network 100, which may be interfaced to different types of systems that may be used in supporting debit transactions. For example, one such system is the automated clearing house ("ACH") system 120, which is an electronic payment-delivery system known to those of skill in the art. The ACH system comprises a network that provides batch-oriented electronic funds transfer governed by the NACHA operating rules. Briefly, the ACH network provides ACH operators that act as an interface between originating and receiving depository financial institutions. Transactions received during a financial institution 128 during day are stored and processed later in batch mode to exploit economies of scale. Debit transactions may also be supported by a debit system 124, sometimes referred to in the art as a network that comprises "debit rails" for effecting communications between financial institutions 128 to execute debit transactions from demand deposit accounts ("DDAs"). The interconnection provided by such debit rails of the debit system 124 allow real-time access to a customer's DDA information, including account balance, so that real-time debits of the DDA may be made. For example, such debit rails may be provided by known networks such as the NYCE® network, the Pulse® network, the STAR® network, and the like. In still other instances, an intermediary system like the ACH system 120 or debit system 124 may be avoided by using a direct connection to a financial institution 128, providing so-called "direct-to-bank" interactions.

Figure 1:
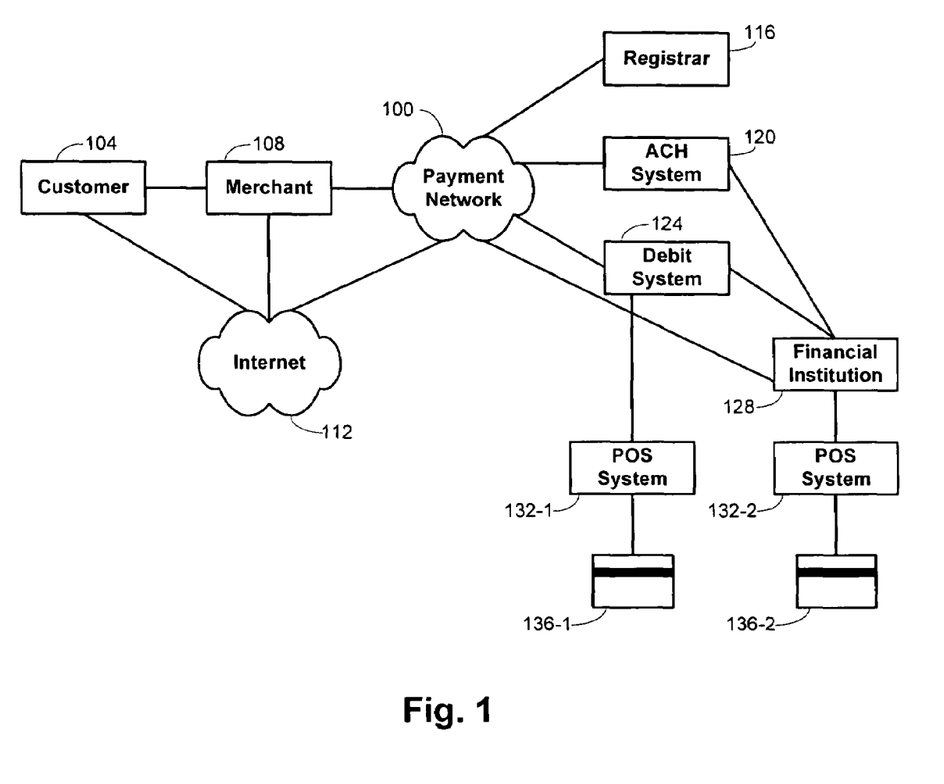
FIG. 1 is a schematic diagram that provides an overview of a system that may be used for online transaction processing in some embodiments of the invention.

The payment network 100 may also be provided in communication with the Internet 112 so that transaction information entered into between a merchant 108 and a customer 104 may be communicated to the payment network 100 to support the transaction. It is generally contemplated that embodiments of the invention will find wide applicability when the customer 104 and merchant 108 interact only through an interface provided by the Internet 112, but FIG. 1 shows a direct interconnection between the customer 104 and merchant 108 to emphasize that other embodiments may make use of transactions that result from direct interaction between the two. Similarly, while many embodiments may rely on the Internet 112 for communication of transaction information to the payment network 100, a direct interconnection between the merchant 108 and the payment system 100 like that shown in FIG. 1 may be used in some alternative embodiments. The security of information communicated between the payment network 100 and merchant 108 is generally greater with a direct connection. This is reflected by the illustration of FIG. 1 in which the payment network 100 is provided with interconnections to the ACH system 120, debit system 124, and direct links to financial institutions 128; as described below, the most sensitive financial information during transactions is communicated on this side of the system.

Parties may register with the payment network 100 using a registrar 116, which may be a separate entity as shown in FIG. 1, but more usually is a merchant 108 or financial institution 128 that is connected with the payment network 100. Furthermore, while the description below focuses primarily on interactions with financial institutions 128 that are routed through the payment network 100 to support online transactions, it should be appreciated that the financial institutions 128 may at the same time support traditional types of transactions. Thus, for example, a point-of-sale system 132 may be provided that accepts a debit instrument 136 such as a magnetic-stripe card, allowing traditional point-of-sale debit transactions to be executed. FIG. 1 illustrates configurations in which the point-of-sale system is coupled with a system of debit rails 124, as in the case of point-of-sale system 132-1, and configurations in which the point-of-sale system is coupled directly with a financial institution 128, as in the case of point-of-sale system 132-2. Such configurations may be used by customers to execute traditional debit transactions at a physical point of sale.

Figure 2:
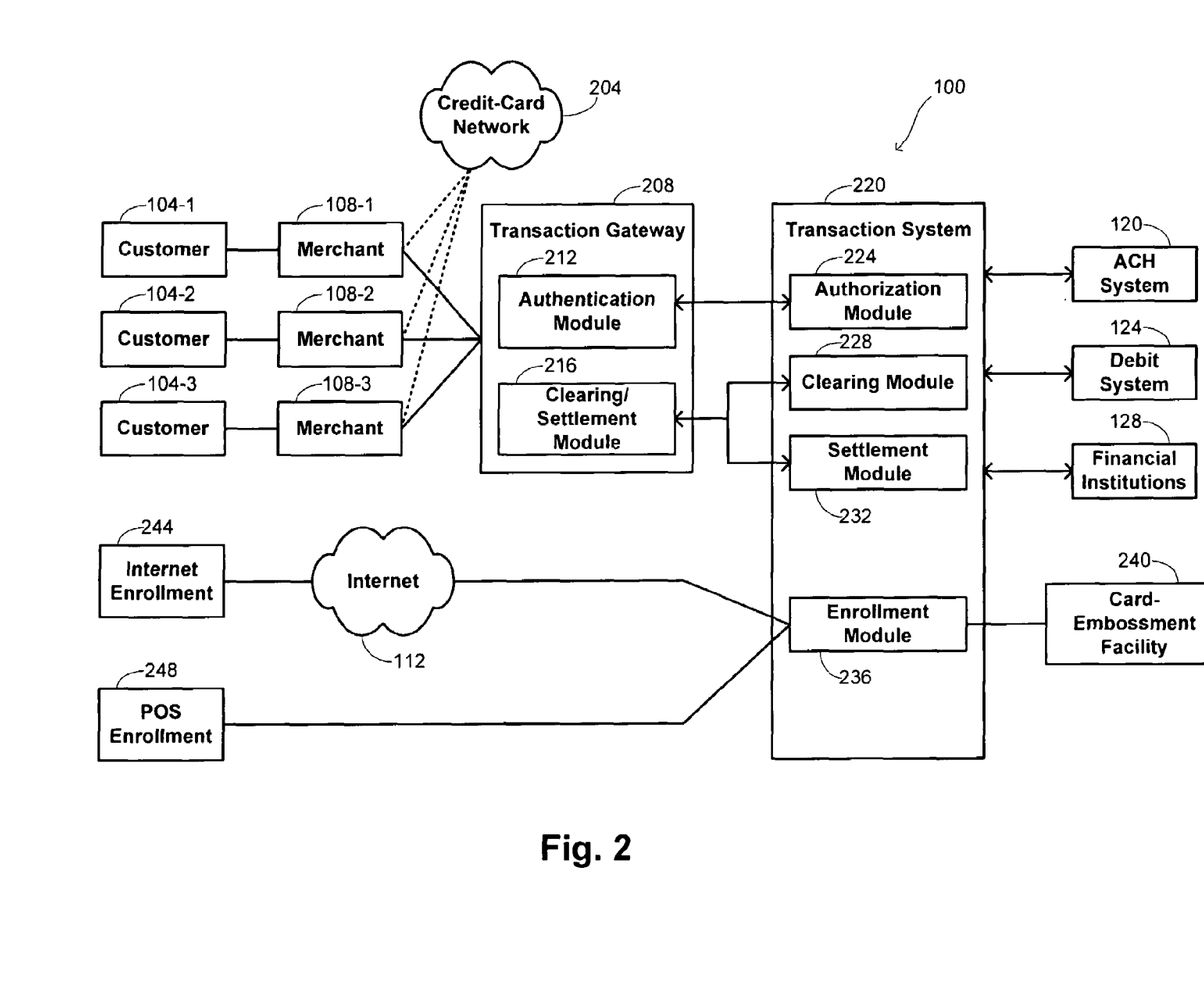
FIG. 2 is a schematic diagram illustrating details of a payment network that may be used in the system of FIG. 1.

Details of the payment network 100 may be understood more fully with reference to FIG. 2, which shows the payment network 100 comprised of a transaction gateway 208 and a transaction system 220, both of which may comprise a plurality of modules used in supporting transactions. The transaction gateway 208 includes an authentication module 212 that authenticates a credential provided by a customer 104 during a transaction. The authentication module 212 interacts with an authorization module 224 comprised by the transaction system 220 to coordinate seeking an authorization for the transaction. In addition, a clearing/settlement module 216 comprised by the transaction gateway 208 interacts with a clearing module 228 and a settlement module 232 comprised by the transaction system 220 in performing clearing and settlement functions. The transaction system 236 may also include an enrollment module 236 to accommodate different methods for a customer to enroll, including through internet enrollment 244 or point-of-sale enrollment described below. The enrollment module 236 may be provided in communication with a card-embossment facility 240 to accommodate those embodiments in which enrollment of a customer may be coupled with preparation of a magnetic-stripe or other type of card.

The structure shown in FIG. 2 emphasizes certain aspects of the arrangement that illustrate its flexibility and integration into existing financial infrastructures. For instance, in any given transaction between a customer 104 and merchant 108, even where the transaction takes place over the Internet, the customer may still have the option of executing the transaction with different mechanisms. Thus, while the solid lines between the merchants 108 and the transaction gateway 208 indicate paths that may be followed if the customer 104 elects to perform a debit transaction, the dashed lines indicate pathways to a credit-card network 204 that may be used if the customer 104 elects to perform a credit transaction. The infrastructure illustrated in FIG. 2 may thus be integrated with existing infrastructures without compromising the performance of such existing infrastructures. The interconnection of the payment network 100 with existing ACH systems 120, debit systems 124, or financial institutions 128 are coordinated with the transaction system 220 in the illustrated embodiment, but may be coordinated by the transaction gateway 208 in certain other embodiments.

It should be appreciated that alterative embodiments of the payment network 100 may not include all the components illustrated in FIG. 2 or may include different components. For instance, the functionality provided by the transaction gateway 208 and the transaction system 220 may be combined into one component. As another example, the modules of the transaction gateway 208 and/or transaction system 200 may be combined or may be further separated into additional modules.

Figure 3:
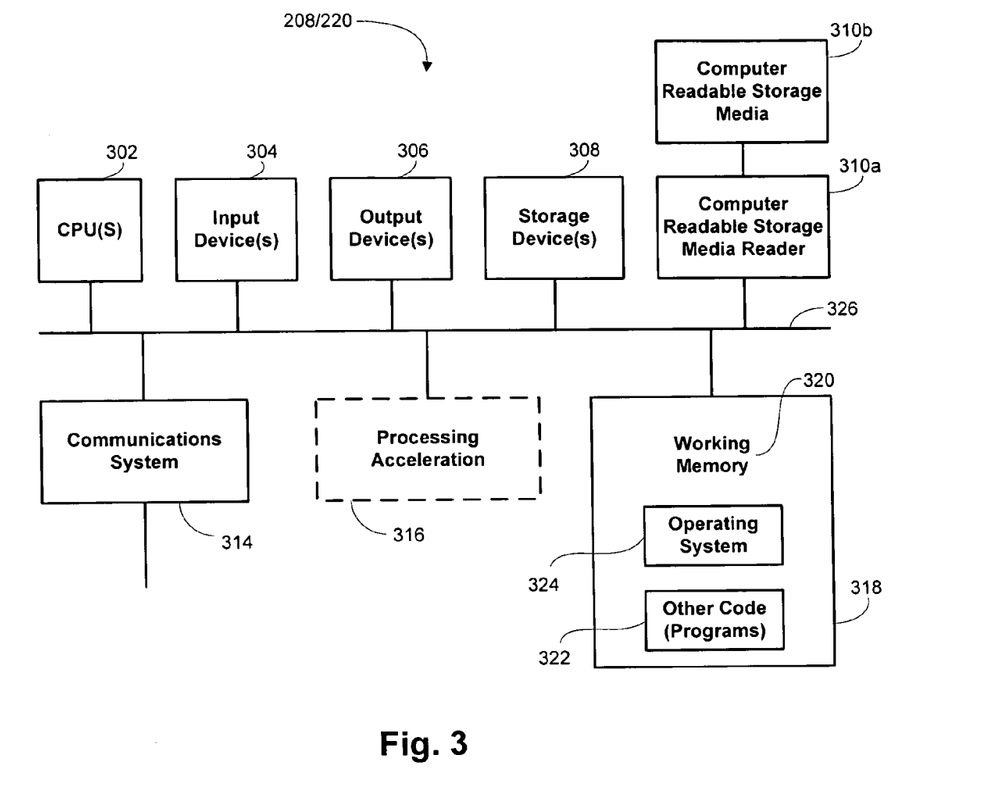
FIG. 3 is a schematic illustration of a computer system on which methods of the invention may be embodied.

While FIG. 2 illustrates a logical structure for the payment system 100, FIG. 3 provides a schematic illustration of a physical structure that may be used to implement the transaction gateway 208 and/or transaction system 220 in one embodiment. FIG. 3 broadly illustrates how individual system elements may be implemented in a separated or more integrated manner. The structure 208/220 is shown comprised of hardware elements that are electrically coupled via bus 326, including a processor 302, an input device 304, an output device 306, a storage device 308, a computer-readable storage media reader 310*a*, a communications system 314, a processing acceleration unit 316 such as a DSP or special-purpose processor, and a memory 318. The computer-readable storage media reader 310*a* is further connected to a computer-readable storage medium 310*b*, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the merchants 108, between the transaction gateway 208 and transaction system 220, with the ACH system 120, with the debit system 124, with the financial institutions 128, with the card-embossment facility 240, or with any other external system as may be desired in implementing embodiments as described below.

The structure 208/220 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

The architecture described above may be used in a variety of embodiments to implement debit-based transactions. Use of the architecture may include enrollment functions, in which customers are assigned credentials that may be used as a mechanism for identifying the customer and the account to be used in the debit transactions. In the physical (non-Internet) realm, the credentials have conventionally comprised a primary account number ("PAN") identified by an embossed magnetic-stripe card and a personal identification number ("PIN") assigned to the customer separately. In the Internet applications described below, the credentials may take a different form, such as a userid/password combination, a file stored on a personal computer or disk, and the like. Once the customer has assigned credentials, he may engage in debit-based transactions using those credentials to provide authentication and seek authorization. As executed transactions accumulate, there may be periodic clearing and settlement functions performed to reconcile the transactions.

Figure 4A:
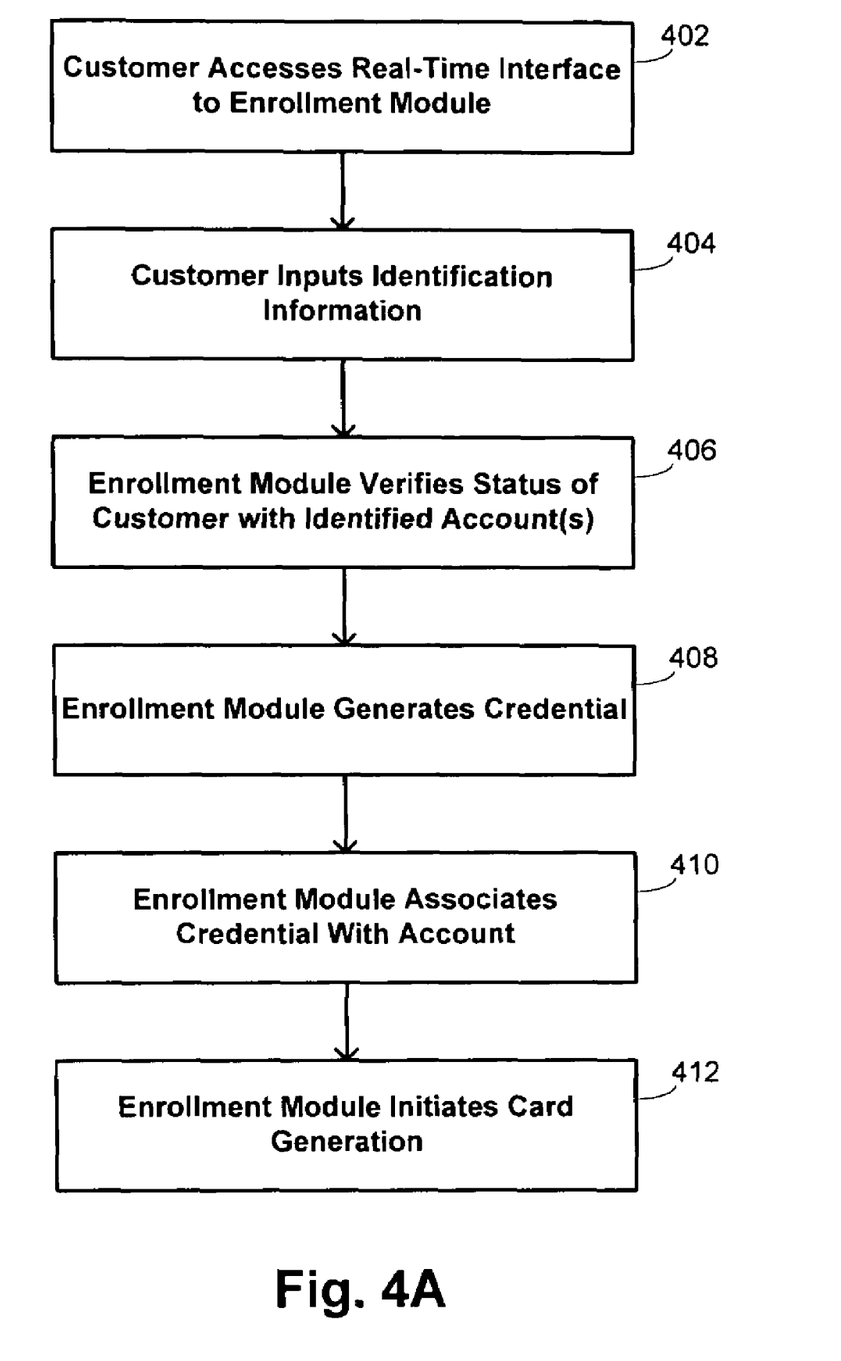
FIGS. 4A and 4B are flow diagrams providing examples of methods for online transaction processing in accordance with certain embodiments.

FIG. 4A provides a flow diagram that summarizes various aspects of an enrollment process used in embodiments of the invention. At block 402, the customer 104 accesses a real-time interface to the enrollment module 236. Such an interface may be provided by a registrar 116 in the form of internet enrollment interface 244 or point-of-sale enrollment interface 248. For example, the enrollment interface might be provided as a special screen on a web site for a financial institution or could be provided as a special screen on a web site for a merchant. In some instances, a merchant could provide a link to the enrollment interface as part of a checkout procedure for customers that are not yet enrolled. The interface provides an entry screen in which the customer 104 may provide identification information at block 404. In embodiments where the registrar is a merchant or financial institution at which the customer 104 is an existing customer, fields in the entry screen may be prepopulated with information drawn from the registrar's database. Information provided by the customer at block 404 may include information identifying one or more accounts, such as demand deposit accounts ("DDAs") to be used in debit transactions. Such identification is typically made by the customer providing the PAN and PIN, together with suitable financial-network routing information. In instances where more than one account is identified, a profile may be used to identify allocations of debit transactions among the multiple accounts or specific identifications may be made at the time of a transaction.

Once the enrollment module has collected the identification information, a verification may be performed at block 406. Such verification may involve communications with the financial institution that maintains the identified account(s) to confirm the existence of the account, its ownership by the customer, and the like. In some instances, the verification at block 406 may additionally include a risk-analysis based on such factors as the balance maintained in the identified account, credit score of the customer, demographic information regarding the customer, and the like. Approval of the customer to participate with the payment system 100 may depend in such instances not only on verification of the account status, but also on the customer having a satisfactory risk level.

If the customer information is accepted by the enrollment module, credentials are generated and transmitted to the customer at block 408. The credentials may be as simple as a userid and password, or may be more complex and include an electronic file that may or may not have encrypted content. The credentials are associated with the account(s) specified by the user during the enrollment so that subsequent presentation of the credentials by the customer allows the payment network 100 to convert the credentials to a form of information suitable for performing a debit transaction. For example, the credentials may be used to determine the PAN/PIN combination used to ride the debit rails 124 or may be used to generate information suitable for an ACH transaction or a direct-to-bank transaction. The mapping between credentials and conventional debit-transaction identification information is maintained securely by the transaction gateway 208. Since this conventional information is not transmitted over the Internet for subsequent transactions, even for Internet-based transactions, there is little risk of it being compromised. In the event that the credentials assigned to the customer are stolen, they may be substituted with new credentials by the transaction gateway 208 without needing to change account information at the financial institutions where the account(s) are held. It should be appreciated that in some embodiments merchants may also need to be enrolled into the system in order to have the ability to accept the customer's credentials as payment for transactions.

Block 412 of FIG. 4A indicates that in some embodiments, generation of a card may be initiated with the enrollment module. This may be especially appropriate in those instances where the customer does not yet have a debit arrangement established. Even though the debit arrangement may be initiated with an online interface to allow the customer to perform debit-based transactions over the Internet, the customer may wish to perform debit transactions conventionally as well. Generating a card having a magnetic stripe encoded with the PAN and issuing a PIN to the customer with the card-generation facility conveniently allows the customer to establish debit capability both online and conventionally at the same time.

Figure 4B:
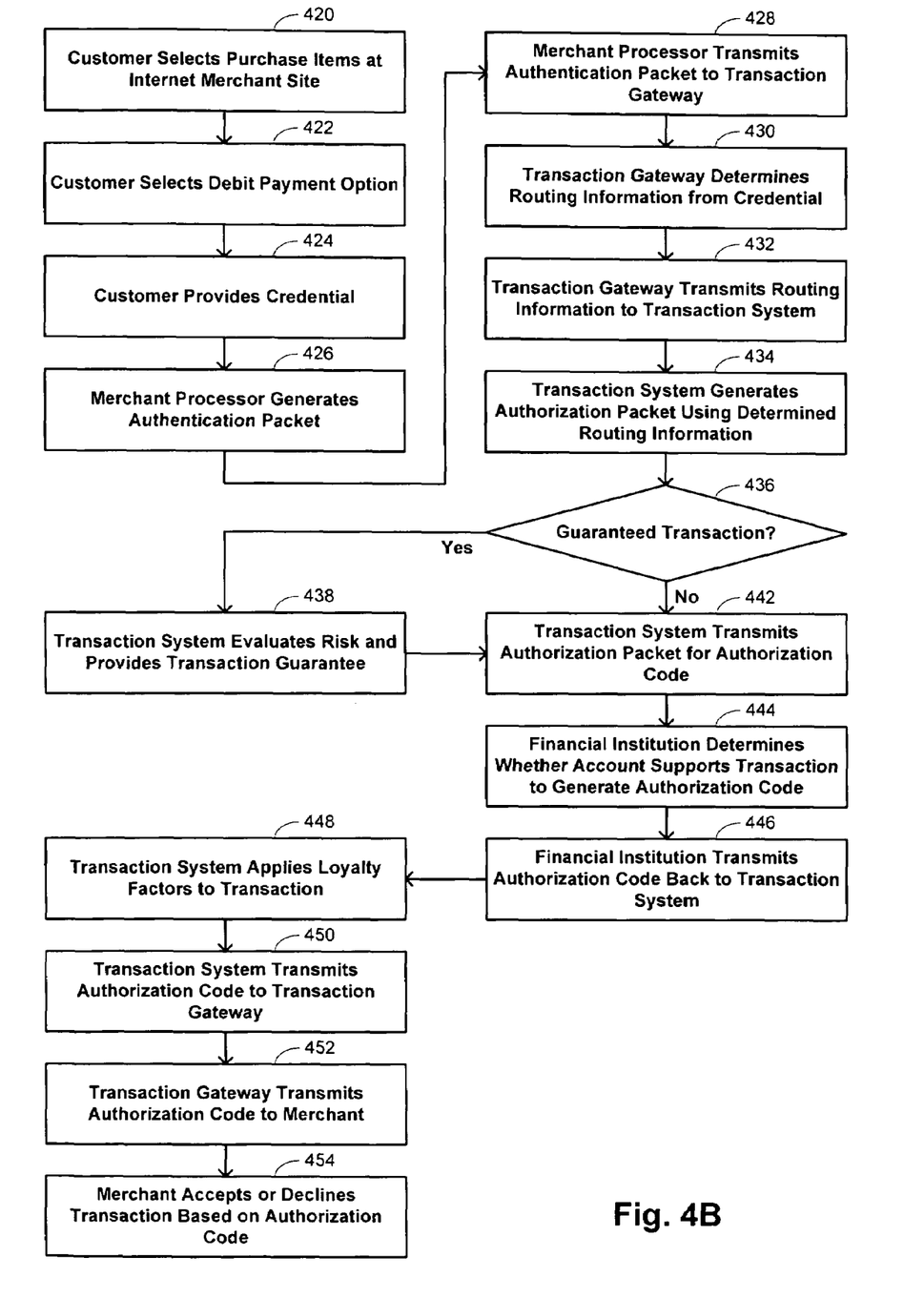

FIG. 4B is a flow diagram that provides an overview of methods used to execute a transaction using the payment system 100 described above. A transaction may be initiated by a customer selecting a variety of purchase items at an Internet merchant site, as indicated at block 420, and then selecting a debit payment option at checkout, as indicated at block 422. In response to a query at the merchant web site, the customer provides his credential at block 424. In cases where the credential comprises a file of encrypted information stored on the customer's personal computer, providing the credential may comprise transmitting the file to a merchant processor over the Internet.

When the merchant processor has access both to details of the transaction, as results from the customer selections made at block 420, and the credentials provided at block 424, the merchant processor generates an authentication packet at block 426. The authentication packet thus usually includes at least a specification of the amount of the transaction, an identification of the merchant, and the credential, but in some instances may include additional information. At block 428, the merchant processor transmits the authentication packet to the transaction gateway 208, which then uses the credential comprised by the authentication packet to determine routing information for the account in the form of a PAN/PIN combination or the like at block 430. This routing information is transmitted to the transaction system 220 with the other information from the authentication packet like merchant identification and transaction amount at block 432. This information is used by the authorization module 224 of the transaction system 220 to generate an authorization packet at block 434.

In some embodiments, merchants may have the option of having transactions guaranteed. There are a number of different arrangements by which requests for guaranteed transactions may be initiated. For example, in some embodiments, a merchant is set up so that all authorizations are treated as guaranteed or all authorizations are treated as non-guaranteed. For such merchants, the transaction system 220 may maintain database records indicating such uniform treatments. In other embodiments, a merchant processor may pass an indicator with the authentication packet that specifies on a transaction-by-transaction basis whether the transaction is to be treated as guaranteed or nonguaranteed. In still other embodiments, rules may be established for implementation by the authorization module to define when to treat transactions as guaranteed or nonguaranteed. Such rules may account for such factors as the size of the transaction, the nature of the goods and/or services being sold, the identity of the customer, and the like, and may be applied uniformly to all merchants or may vary in their implementation on a merchant-by-merchant basis.

A determination is thus made at block 436 in accordance with these different criteria whether a transaction is to be treated as a guaranteed transaction. If so, the transaction system 220 performs a risk analysis of the transaction at block 438 to determine whether to provide the guarantee. Such a risk analysis may take account of a variety of factors, such as the size of the transaction, the credit history of the customer, and the like, and may use standard techniques known to those of skill in the art in evaluating the risk. If the risk level associated with the transaction is acceptable, then the transaction is executed as a guaranteed transaction; if the risk level is determined to be unacceptably high, the transaction may be declined or an option may be fed back through the transaction gateway 208 to offer the merchant the possibility of treating the transaction as a nonguaranteed transaction. This provides a mechanism for overriding the predetermined factors defining when to treat a transaction as guaranteed, and offers the merchant an opportunity to apply its own risk analysis to determine whether to accept the transaction as a nonguaranteed transaction.

At block 442, the transaction system seeks an authorization code for the transaction from the financial institution that holds the account to be debited. Seeking such an authorization code begins by transmitting the authorization packet that was generated at block 434 to the financial institution 128.

Such transmittal may take place through any suitable debit-transaction mechanism, including through the ACH system 120, through the debit system 124, or through a direct-to-bank connection to the financial institution 128 as described previously.

In some embodiments, logical rules may be set up to determine which transaction network to select. For instance, the transaction network may be selected based on a risk analysis of the financial transaction performed by the processor. Higher risk transactions may be processed on a transaction network with higher transaction costs but with little or no risk that funds will be available to cover the costs. Similarly, lower risk transactions may be processed on a transaction network with lower transaction costs but having a higher risk that funds may not be available to cover the costs. By way of example, higher risk transactions may use the debit system 124, while lower transactions may use the ACH system 120. Other criteria, such as whether the merchant requests a guarantee, may also be used to select the transaction network.

The financial institution 128 determines at block 444 whether the account identified by the authorization packet has sufficient cleared funds to support the transaction and transmits an authorization code back to the transaction system 220 to reflect its determination at block 446. If the account has sufficient cleared funds and there are no other derogatory marks associated with the account, the authorization code comprises an approval of the transaction, while a failure to meet those conditions results in the authorization code comprising a denial of the transaction.

The transaction system 220 may, in some embodiments, be equipped to perform additional operations related to the transaction. Merely by way of example, FIG. 4B notes at block 448 that in some embodiments, loyalty factors may be applied to the transaction. Such loyalty factors typically require monitoring an accumulated transaction amount associated with an individual customer, perhaps based on certain defined classifications of transactions, so that rewards may be provided to the customer when certain accumulation levels are met. Such rewards may take the form of points that may be redeemed for air travel or other products, might take the form of cash rewards that are deposited directly to the customers identified account, and the like. Still other types of operations additional to coordination of the debit transaction will be known to those of skill in the art and may be applied to transactions in other embodiments.

At block 450, the transaction system 220 transmits the received authorization code to the transaction gateway 208, which transmits it to the merchant 108 at block 452. The merchant makes a determination whether to accept or decline the transaction based on the authorization code, usually acting in strict accordance with the recommended acceptance or rejection of the transaction as determined by the financial institution 128. In some instances, because the way the transaction information is routed as described above, the returned code may be converted from one form to another by the transaction system 220 or transaction gateway 208. In particular, such conversion is typically performed so that the merchant 108 may make its decision whether to accept or decline the transaction based on the type of code response expected without substantial modification of its system. For example, in an embodiment where the merchant is equipped to receive credit-based authorization codes and transmits the authentication packet in a form that requests execution of a guaranteed transaction, the code returned to the transaction gateway 208 may take the form of a debit-based authorization code. In such an embodiment, the transaction gateway 208 may convert the debit-based code to a corresponding credit-based code that is easily understood by existing merchant systems.

In some embodiments, reporting capabilities may be provided to the customers. These reports may allow a customer to view previous transactions for the customer that were paid for using the customer's credentials. Alternately or additionally, reports may also be provided to merchants to allow the merchant to view merchant transactions that used payment network 100.

In addition, the above description has focused generally on exemplary embodiments in which a transaction is executed for a single group of goods and/or services. In other embodiments, it may be desirable for the transaction to be executed in parts. For instance, in some transactions the merchant may be ready to deliver only some of the goods and/or services being purchased at that time, while other goods and/or services are to be delivered later. This may be the case, for instance, where some goods are not currently stocked in inventory, where some goods require alterations to conform to the customer's requirements, where some services are to be supplied over a period of time, and the like. In these embodiments, the customer may prefer not to accept the risk that the merchant will fail to deliver the remaining goods and/or services by making full payment at the time of the transaction; similarly, the merchant may prefer not to accept the risk that the customer will be unable to pay the later-delivered goods and/or services, particularly where special efforts are needed by the merchant to acquire and/or modify the goods and/or services. Accordingly, in such embodiments, the architecture may accommodate maintaining funds collected from the customer for the entire transaction in a surrogate account, with transfers being made from the surrogate account to the merchant's account when the merchant performs its obligations under the transaction. Methods and systems that integrate such functionality are described in further detail in co-pending, commonly assigned U.S. patent application Ser. No. 10/262,530, entitled "METHODS AND SYSTEMS FOR PROCESSING PARTIAL PAYMENTS USING DEBIT CARDS," filed Sep. 30, 2002 by Margaret Morgan Weichert and John Joseph Mascavage III, the entire disclosure of which is incorporated herein by reference for all purposes.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for coordinating an Internet-based financial transaction between an Internet merchant and a customer, the method comprising:

receiving, with a payment network, a first information packet comprising an electronic file having encrypted content and transaction information specifying at least a cost of the Internet-based financial transaction;

decrypting the electronic file, with the payment network, to recover a primary account number ("PAN") that identifies a financial account maintained by the customer at a financial institution and to recover a personal identification number ("PIN") assigned to the customer for accessing the identified financial account;

generating, with the payment network, a second information packet comprising the transaction information, the PAN, and the PIN;

transmitting, with the payment network, the second information packet to the financial institution with a request to perform a debit transaction from the identified financial account for the specified cost of the Internet-based financial transaction;

receiving, with the payment network, a response from the financial institution indicating approval or denial of the debit transaction;

determining, with the payment network, whether to provide a guarantee of the Internet-based transaction to the Internet merchant;

determining, with the payment network, whether to credit a loyalty program for the customer; and transmitting, with the payment network, an authorization code indicating approval or denial of the Internet-based transaction.

2. The method recited in claim 1 wherein:
the first information packet includes an identification of the Internet merchant; and
determining whether to provide the guarantee of the Internet-based transaction comprises determining whether the Internet merchant is one of an identified list of Internet merchants who request guarantees of all Internet-based financial transactions.

3. The method recited in claim 1 wherein determining whether to provide the guarantee of the Internet-based transaction comprises determining whether the transaction information is consistent with a predefined set of parameters.

4. The method recited in claim 1 wherein the first information packet further comprises a request from the Internet merchant for the guarantee of the Internet-based transaction.

5. A payment network comprising:
a communications device;
a processor;
a storage device; and
a memory coupled with the processor, the memory comprising a computer-readable medium having a computer-readable program embodied therein for directing operation of the payment network, the computer-readable program including:
instructions for receiving, with the communications device, a first information packet from the Internet merchant, the first information packet comprising a credential assigned to the customer and transaction information specifying at least a cost of the Internet-based financial transaction;
instructions for determining from the credential, with the processor, account information that identifies a financial account maintained by the customer at a financial institution and authorization information that allows debit access to the identified financial account;
instructions for generating, with the processor, a second information packet comprising the transaction information, the account information, and the authorization information;
instructions for transmitting, with the communications device, the second information packet to the financial institution with a request to perform a debit transaction from the identified financial account for the specified cost of the Internet-based financial transaction; and
instructions for crediting, with the processor, a loyalty program for the customer in response to execution of the Internet-based financial transaction.

* * * * *